Oct. 30, 1923.

A. M. GREENE 1,472,216

WHEELED VEHICLE KNOWN AS SCOOTER

Filed Dec. 14, 1921

INVENTOR
Alonzo M. Greene,
BY
ATTORNEY

Patented Oct. 30, 1923.

1,472,216

UNITED STATES PATENT OFFICE.

ALONZO MORTON GREENE, OF NEW LONDON, CONNECTICUT.

WHEELED VEHICLE KNOWN AS SCOOTER.

Application filed December 14, 1921. Serial No. 522,373.

*To all whom it may concern:*

Be it known that I, ALONZO MORTON GREENE, a citizen of the United States, resident of New London, in the county of New London, State of Connecticut, have invented Improvements in Wheeled Vehicles Known as Scooters.

The common form of "scooter" is a narrow board mounted horizontally on two wheels, or sets of wheels. On the upper side of the board at one end is a vertical steering rod.

The "scooter" is intended to be ridden by a person in a standing or upright position, and propelled by pushing one foot on the ground while the other rests on the board. This causes the vehicle to be propelled forward until the momentum is lost; the act of pushing being continued to maintain the velocity.

The main object of my invention is to provide a construction of this general character which can be operated in the usual way and which also is provided with treadles so that it can be operated by foot power from a standing position. Another object is to provide a convenient form of construction of this character in which the driving mechanism is housed in such a manner as to prevent accident to the rider from contact with the transmitting mechanism.

Figure 1:
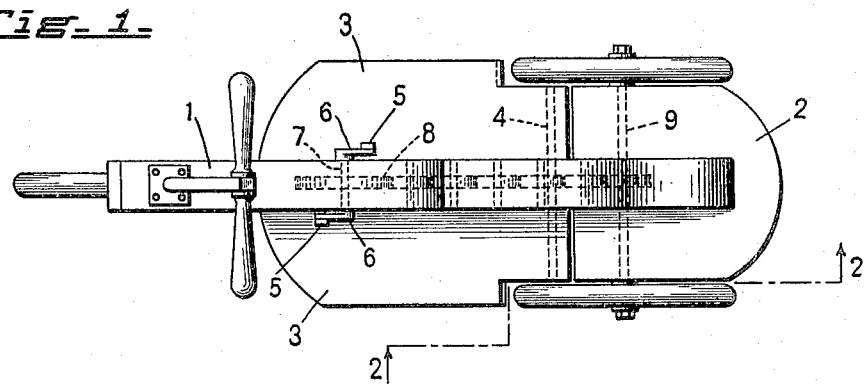
Figure 2:
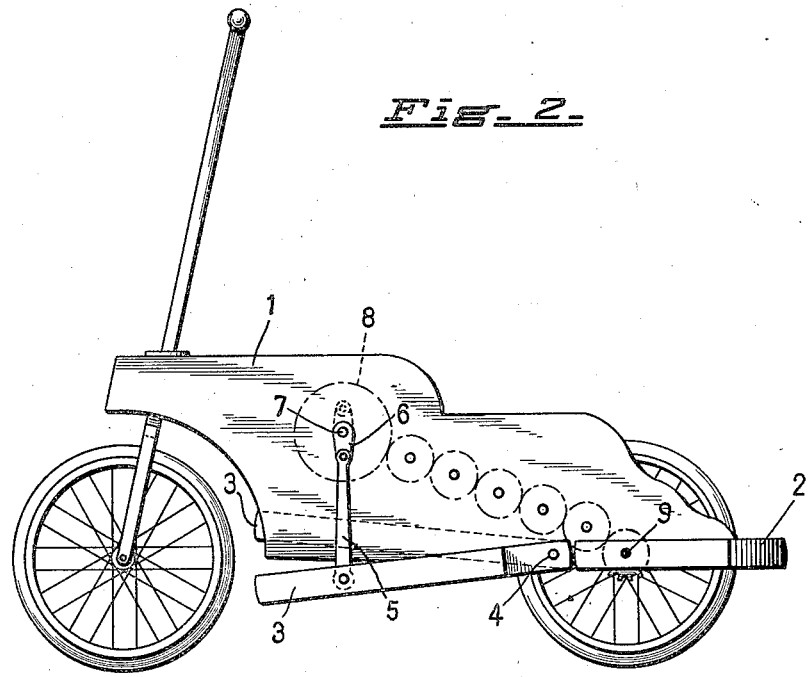

I attain this object by the mechanism illustrated in the accompanying drawing in which—Figure 1 is a plan view of the entire vehicle; Figure 2 is the vertical view. Similar numerals refer to similar parts throughout both views. Beneath the main body (1) or central vertically disposed frame, the forward end of which is supported by a steering post and wheel of the vehicle is fixed securely a platform (2) supported by the axle and rear wheels on which the feet rest while coasting. Two treadles (3) are attached to the body by a rod (4) which acts as a pivot. The treadles are attached by connecting rods (5) to cranks (6) which are attached to shaft (7) passing through the body (1). Enclosed in the body on shaft (7) is a gear (8) conected by a chain of gears to axle (9).

Propulsion is accomplished by the reciprocating action of the feet on the treadles, power being transmitted through the chain of gears to the rear wheels.

The platform is in a convenient place for the rider to stand in coasting or pushing the scooter in the usual manner and the treadles are arranged in such a position that it is merely necessary to push one foot or both feet forward from the standing position in order to operate the treadles. In fact the rider may have his heels on the platform and work the treadles with his toes. The driving mechanism which connects the shaft 7 with the shaft 9 being entirely housed within the body, it is impossible for the rider to come in contact with it. The treadles are so arranged with respect to the body that the body serves to keep the feet apart.

I claim:

1. A vehicle comprising a flat vertically disposed body, a platform secured to the lower rear end thereof, a shaft with wheels supporting said platform, a steering rod and wheel connected to the front end of said body, treadles pivoted at opposite sides of said body immediately in front of said platform, a crank shaft supported by said body and connected to said treadles and a driving connection between said crank shaft and said wheel shaft.

2. A vehicle comprising a thin central body, a wheel shaft at the rear end of the body, a steering wheel at the front end of the body, broad flat treadles pivoted to the opposite sides of the rear portion of said body and having their front ends movable up and down close to said body, a crank member rotatably supported by the body adjacent the center thereof and above the front ends of the treadles, connecting rods depending from said crank member to said treadles, said treadles having foot supporting portions beginning at their rear ends and extending forwardly alongside of said rods and a driving connection housed in said body between said crank member and said rear shaft.

3. A vehicle comprising a flat vertically disposed central body, a rear wheel shaft carried thereby, a front steering rod and wheel for said body, a rod extending through the lower part of said body, treadles pivoted on said rod close to the opposite sides of said body, a crank member rotatably mounted in the upper part of said body, depending rods connecting said crank member and said treadles and a driving connection between said crank member and said rear wheel shaft and housed within said flat body.

4. A vehicle comprising a body, a platform at the rear extending laterally of said body, a rear shaft and wheels for said body, a steering wheel and rod connected to the front end of said body, treadles pivoted at the front end of said platform and extending forwardly in the general plane thereof, a crank member in said body, rods connecting said member and the front ends of said treadles and a driving connection in said body between said crank member and said rear shaft.

5. A vehicle comprising a vertically disposed body, a platform at the rear thereof extending laterally of said body, a rear wheel shaft supported by said platform, a steering wheel and rod connected to the front end of said body, broad flat treadles pivoted at the front end of said platform and having their upper surfaces extending forwardly in substantially the same general plane with the upper surface of said platform, a crank member supported in said body above said treadles, rods connecting said crank member and said treadles and a driving connection between said crank member and said wheel shaft.

ALONZO MORTON GREENE.